Oct. 3, 1950     C. J. HARRAH     2,524,257
ENGINE CONTROL FOR ELECTRIC WELDING MACHINES
Filed July 21, 1947
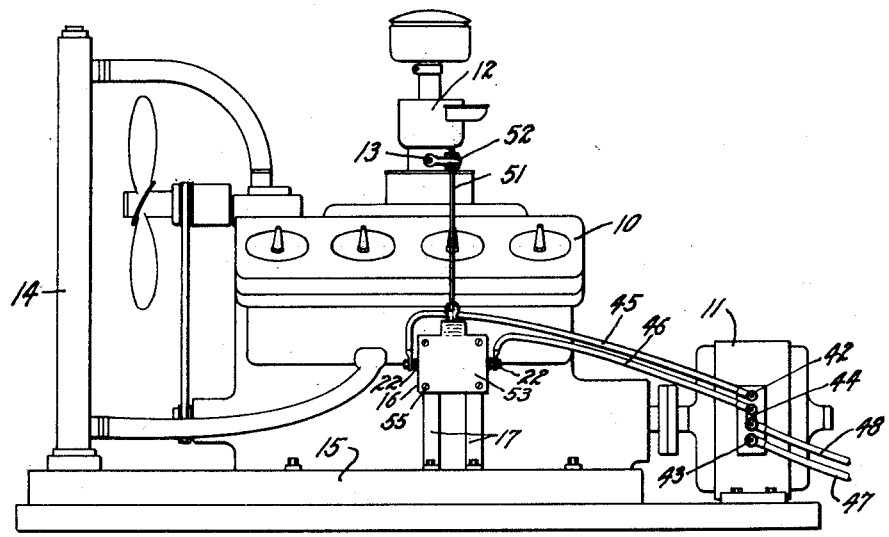
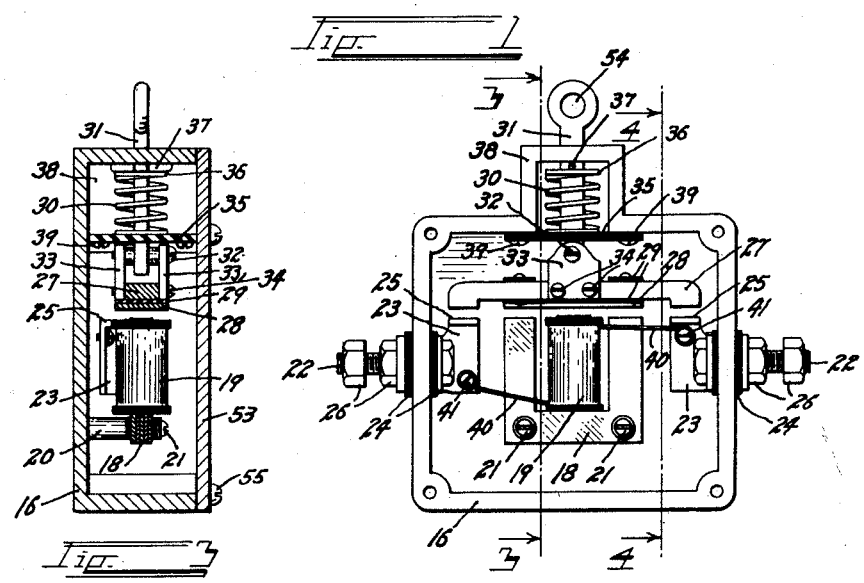
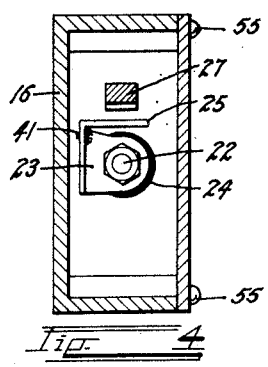
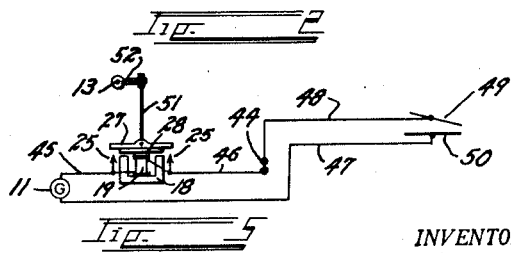
INVENTOR.
CHARLES J. HARRAH
BY
ATTORNEY Patented Oct. 3, 1950

2,524,257

UNITED STATES PATENT OFFICE 2,524,257

ENGINE CONTROL FOR ELECTRIC WELDING MACHINE

Charles J. Harrah, Denver, Colo.

Application July 21, 1947, Serial No. 762,472

1 Claim. (Cl. 290—40)

This invention relates to an engine control for electric welding generators, and has for its principal object the provision of a simple and highly efficient device which will automatically speed up an engine driving a welding generator when the current is being used for welding purposes, and which will automatically slow down the engine when the welding current is not being used, thereby avoiding waste of engine fuel and wear and tear on the mechanism when the current is not required.

The other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of a conventional welding generator plant, illustrating the invention in place thereon;

Fig. 2 is a face view of the improved engine control with its cover plate removed;

Fig. 3 is a vertical section therethrough, taken on the line 3—3, Fig. 2;

Fig. 4 is a similar section, taken on the line 4—4, Fig. 2; and

Fig. 5 is a circuit diagram, illustrating the operation of the device.

In Figs. 3 and 4 the cover plate is shown in place. In Fig. 1, conventional elements of a typical welding generator unit are indicated as follows: engine 10, generator 11, carburetor 12, throttle valve shaft 13, radiator 14, and base frame 15. In Fig. 5 a welding electrode is diagrammatically indicated at 49 and the work being welded is indicated at 50. This invention is designed to control the movements of the throttle valve shaft 13 in response to the demands made upon the generator 11.

The improved control is preferably mounted in a suitable housing 16 supported adjacent the engine 11 in any desired manner, such as upon brackets 17. The housing is closed by means of a suitable cover plate 53 held in place by means of cap screws 55. The housing contains a magnetic core 18, preferably of the laminated W type. This type of core provides three poles in alignment with each other. A low-resistance solenoid 19 is wound about the middle pole of the core 18. The core 18 is secured to the housing 16 in any desired manner, such as by means of supporting posts 20 and attachment screws 21.

A threaded binding post 22 extends through each side wall of the housing 20. The posts 22 support terminal contact members 23 on the interior of the housing. The binding posts 22 are provided with the usual binding nuts 26 and are insulated from the housing 16 by means of suitable insulation 24. The terminal contact members 23 are formed so that they will lie flat against the insulation 24 at the sides of the housing and will turn outwardly at their upper extremities to form contact surfaces 25.

A circuit is closed between the contact surfaces 25 by means of a switch blade 27 preferably of copper. A magnetic armature 28 of soft iron or magnetic alloy is secured to and below the switch blade 27 in any desired manner, and is electrically insulated therefrom by means of suitable insulation 29.

When the solenoid 19 is energized, the armature 28 will be attracted thereto, pulling the switch blade 27 into contact with the contact surfaces 25. The switch blade is pulled away from these surfaces, when the solenoid is de-energized, by means of a compression spring 30 surrounding a plunger 31 and contained within an upwardly extending spring chamber 38 formed on the housing 16.

The lower extremity of the plunger is hingedly attached upon a hinge screw 32 which passes through the plunger and through two ears 33 preferably of insulating material, such as fiber or Bakelite. The ears 33 are attached to the switch blade 27 by means of suitable screws 34. The spring 30 is compressed between a cross plate 35, also preferably of insulating material, and a spring washer 36. The spring washer is prevented from moving along the plunger 31 by means of a cross pin 37.

The plunger 31 is flattened and passes through an elongated hole in the cross plate 35 to prevent horizontal rotation of the switch member 27.

The cross member 35 is secured within the housing beneath the chamber 38 by means of suitable screws 39. The solenoid 19 is bridged between the contact members 23 by means of suitable conductors 40 and attachment screws 41.

The two power terminals from the generator 11 are indicated at 42 and 43. Two bridged terminals are indicated at 44. The power terminal 42 is connected to one of the binding posts 22 by means of a conductor 45. The other binding post 22 is connected by means of a conductor 46 with one of the bridged terminals 44.

The ground lead to the work 50 is shown at 47, extending from the terminal 43, and the electrode lead is indicated at 48, leading to the welding electrode 49. The plunger 31 is connected by means of a connecting rod 51, with a throttle lever 52 secured on the throttle shaft 13.

The length of the connecting rod 51, and the length and position of the throttle lever 52, is such that, when the switch blade 27 is in contact with the contact surfaces 25, the engine throttle will be opened to full load position, and when the switch blade 27 is in the open position of Fig. 2, the throttle will be in the idling position.

The device operates as follows: let us assume that the engine 10 is idling, and that a minimum current is being generated by the generator 11. The welder now brings his electrode 49 into contact with the work 50. This closes a circuit from the generator 11 through the conductors 45, 40, 48, and 47, through the solenoid 19, energizing the magnetic core 18, causing it to attract the armature 29 and to snap the switch blade 27 against the contact surfaces 25.

This pulls the plunger 31 downwardly to rotate the throttle shaft 13 to speed up the engine 10 to furnish full welding current. This also bridges the heavy welding current across the solenoid 19 through the switch blade 27.

It might be expected that this bridging would de-energize the solenoid 19 so as to release the armature 28. This is not true in actual practice, however. First, because it requires very little current in the solenoid to hold the armature 28 in contact after it has once been attracted. Second, there is sufficient resistance between the mechanical contacts of the switch blade 27 and the surfaces 25 to allow sufficient current to flow through the low resistance winding of the solenoid 19, to maintain the armature 28 in contact during the welding. The instant the welder breaks the circuit by removing his electrode 49 from the work 50, the circuit through the solenoid 19 will be completely broken, thus de-energizing the magnetic core and allowing the spring 30 to snap the plunger 31 upwardly, again bringing the engine to the idling position.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A combination circuit closing device and throttle opening device for engine driven, electric welding generators, comprising: a housing; two electrical terminals extending into said housing from opposite sides thereof; a movable switch bar positioned to extend from one terminal to the other; a solenoid positioned adjacent said switch bar so as to attract the latter into contact with said terminal; electrical conductors connecting said solenoid in series with said two terminals; a plunger extending into said housing; a pivotal connection between said switch bar and said plunger to communicate the movements of the former to the latter; spring means urging said plunger outwardly to withdraw said switch bar from said contacts; means for connecting said plunger to the throttle of an engine; and means for connecting said contacts in circuit with a generator.

CHARLES J. HARRAH.

REFERENCES CITED

The following references are of record in the file of this patent:

UNITED STATES PATENTS

| Number | Name | Date |
|---|---|---|
| 664,087 | Hewlett | Dec. 18, 1900 |
| 878,525 | Grob | Feb. 11, 1908 |
| 1,004,860 | Eastwood | Oct. 3, 1911 |
| 1,966,245 | Harvey | July 10, 1934 |
| 2,150,294 | Roosa et al. | Mar. 14, 1939 |
| 2,172,026 | Longley | Sept. 5, 1939 |
| 2,182,030 | McEniry | Dec. 5, 1939 |
| 2,227,486 | Campbell | Jan. 7, 1941 |